June 14, 1938.  G. MEYER  2,120,415
COUPLING DEVICE FOR MOTOR LORRY TRAINS
Filed April 9, 1936

Inventor:
Gustave Meyer
By Chaturar Company
attys

Patented June 14, 1938

2,120,415

UNITED STATES PATENT OFFICE 2,120,415

COUPLING DEVICE FOR MOTOR LORRY TRAINS

Gustav Meyer, Hanover, Germany

Application April 9, 1936, Serial No. 73,548
In Germany November 2, 1935

1 Claim. (Cl. 280—33.15)

The invention relates to an improved coupling for motor lorry trains with supplemental cars which is self-acting in that the coupling is actuated by a relative movement between the trailer and the supplemental car.

An object of the invention is to obtain a little distance or space between the coupled cars. A further object of the invention is to obtain a coupling in which the coupling member of the supplemental car is easily fitted with the coupling member of the trailer. A further object of the invention is to obtain a coupling which is easily disconnected from the ends of the cars.

Further objects and particulars of the invention will be clear from the following detailed description in connection with the accompanying drawing showing some embodiments of the invention and in which.

Figure 1:
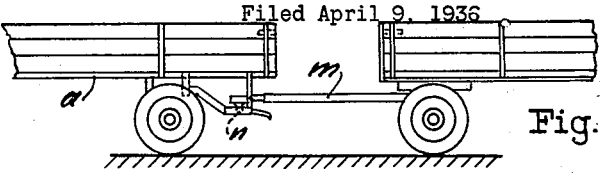
Fig. 1 is a partial view of a motor lorry train with the coupling spot.
Figure 2:
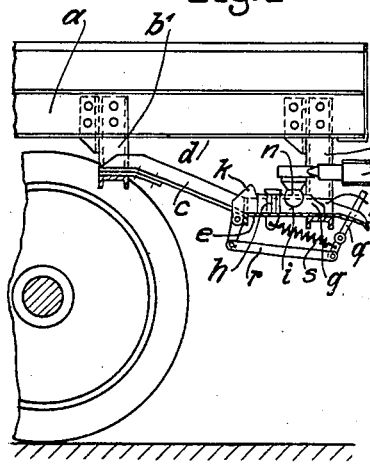
Fig. 2 is a longitudinal section through the coupling device.
Figure 3:
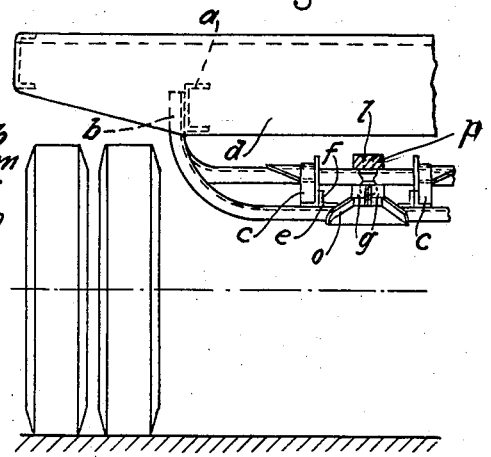
Fig. 3 is a back-view of the coupling device.
Figure 4:
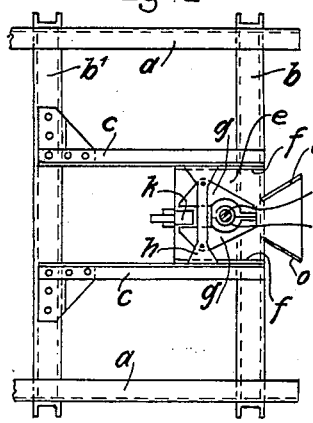
Fig. 4 is a plan view of the coupling device.
Figure 5:
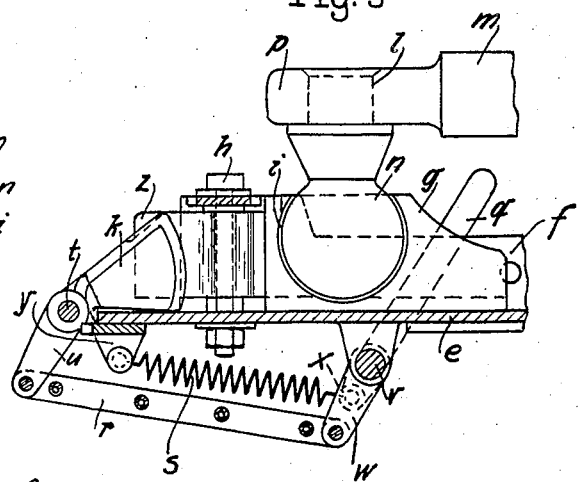
Fig. 5 is a longitudinal axial section through the coupling device drawn to a magnified scale and Fig. 6 is another embodiment of the invention.

Referring now to the drawing, two stirrups $b$, $b^1$ are fixed to the longitudinal girders $a$ of the chassis of a motor lorry in a parallel distance from each other; two traverses $c$ are fixed to these stirrups. Supported between these two traverses $c$ which should be arranged in a suitable distance beneath the bottom $d$ of the car is a plate $e$ with edge portions $f$ bent at right angles and fixed to the traverses $c$ by the portions $f$. The stirrup $b^1$ is preferably lower than the stirrup $b$. The coupling claws $g$ are supported on the plate $e$ and may be turned round the vertical pin or pivot $h$. In closed position the claws $g$ form in a spherical seat $i$. This position of the claws $g$ can be fixed by a locking bolt $k$ which can be introduced between the claws and can be operated from the driver's seat or by means of a hand lever into the blocking- and loosening position. A spherical pivot $n$ is fixed to the head of the shafts $m$ of the supplementary car, e. g., vertically to the axis of the shaft, this pivot engaging into the spherical seat $i$ in the coupling operation. For facilitating the leading-in, guiding walls $o$ are provided at the plate $e$. The spherical pivot $n$ may be fixed in the ear of the shaft $p$ by means of riveted bolts $l$.

Figure 6:
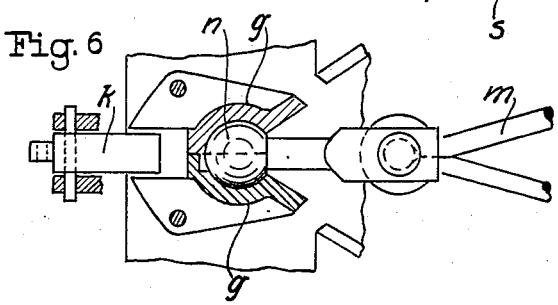

According to Fig. 6 the axis of the spherical pivot $n$ is arranged in the direction of the shaft $m$ of the supplementary car, the coupling claws $g$ being constructed in suitable way.

The hand lever $q$ for actuating the locking bolt $k$ may be connected with the locking bolt $k$ by means of a lever system $r$. By means of one or two springs $s$ the bolt $k$ is led back into the blocking position and kept therein. A lever $u$ is fixed on the horizontal pivot $t$, the push-pull rod $r$ acting upon this lever $u$ and being connected with the lever $w$ fixed on the axis $v$ of the hand lever $q$. The helical springs $s$ are fixed to further levers $x$ which are fixed to the axis $v$, these springs $s$ being secured to the points $y$. The springs $s$ act in such a way that they pull the locking bolt $k$ between the projections $z$ of the coupling claws as soon as the claws take the closed coupling position. Simultaneously the springs $s$ move the hand lever $q$ back into its initial position. When operating the hand lever $q$ the rod $r$ of the locking bolt is lifted.

In open position of the claws the springs strongly press the bolt against the projections of the claws and thereby keep the claws in open position so that the spherical pivot may be introduced between the claws. When introducing the pivot, it presses the claws into the closed position and the bolt automatically falls between the projections of the claws and is kept in this position by springs so that any undesired loosening of the bolt cannot occur.

The coupling device according to this invention improves the ability of the motor lorry train to adapt itself to unevenness of the road to an extent not obtainable with the existing couplings.

I claim:—

A self acting coupling device for motor lorry trains comprising, in combination, two horizontally movable jaws forming a spherical seat carried by the lorry, a shaft carried by the trailer, a spherical stud carried by said shaft adapted to engage in said spherical seat closing the jaws, a pivotally mounted bolt for locking said jaws closed, a pivotally mounted spring controlled hand lever for actuating said locking bolt, the pivot of the hand lever being spaced from the pivot of the locking bolt, an arm carried by the pivot of the hand lever, an arm carried by the pivot of the locking bolt, a link connecting said arms, a plate mounted below the jaws and inclined members carried by said plate for guiding the spherical stud into the spherical seat.

GUSTAV MEYER.